(12) United States Patent
Kwon et al.

(10) Patent No.: US 10,090,540 B2
(45) Date of Patent: Oct. 2, 2018

(54) METHOD FOR CONTROLLING STARTUP OF FUEL CELL VEHICLE

(71) Applicant: Hyundai Motor Company, Seoul (KR)

(72) Inventors: Sang Uk Kwon, Gyeonggi-do (KR); Kyung Won Suh, Seoul (KR)

(73) Assignee: Hyundai Motor Company, Seoul (KR)

( * ) Notice: Subject to any disclaimer, the term of this patent is extended or adjusted under 35 U.S.C. 154(b) by 327 days.

(21) Appl. No.: 15/186,046

(22) Filed: Jun. 17, 2016

(65) Prior Publication Data

US 2017/0170496 A1 Jun. 15, 2017

(30) Foreign Application Priority Data

Dec. 9, 2015 (KR) ........................ 10-2015-0175302

(51) Int. Cl.

| B60L 11/18 | (2006.01) |
| H01M 8/04225 | (2016.01) |
| H01M 8/04302 | (2016.01) |
| B60R 16/023 | (2006.01) |
| B60R 16/033 | (2006.01) |
| H01M 8/04089 | (2016.01) |
| H01M 8/04223 | (2016.01) |
| H01M 8/04537 | (2016.01) |
| H01M 8/04791 | (2016.01) |
| H01M 8/04858 | (2016.01) |

(Continued)

(52) U.S. Cl.
CPC ..... *H01M 8/04225* (2016.02); *B60L 11/1885* (2013.01); *B60R 16/0238* (2013.01); *B60R 16/033* (2013.01); *H01M 8/0488* (2013.01); *H01M 8/04089* (2013.01); *H01M 8/04231* (2013.01); *H01M 8/04302* (2016.02); *H01M 8/04552* (2013.01); *H01M 8/04559* (2013.01); *H01M 8/04753* (2013.01); *H01M 8/04798* (2013.01); *H01M 16/006* (2013.01); *H01M 2250/20* (2013.01); *Y02T 90/32* (2013.01)

(58) Field of Classification Search
CPC .................................................... B60L 11/1885
See application file for complete search history.

(56) References Cited

U.S. PATENT DOCUMENTS

| 2010/0055522 A1* | 3/2010 | Manabe | .................. B60L 1/003 |
| | | | 429/431 |
| 2014/0065502 A1* | 3/2014 | Furusawa | ......... H01M 8/04552 |
| | | | 429/429 |

FOREIGN PATENT DOCUMENTS

| JP | 2004-296351 A | 10/2004 |
| JP | 2005-116402 A | 4/2005 |

(Continued)

*Primary Examiner* — Daniel Cavallari
(74) *Attorney, Agent, or Firm* — Mintz Levin Cohn Ferris Glovsky and Popeo, P.C.; Peter F. Corless (57) ABSTRACT

A method for controlling startup of a fuel cell vehicle is provided. The disclosed method includes detecting generation of a startup command from a vehicle and supplying hydrogen to a fuel cell by opening a hydrogen valve. Additionally, the method includes detecting whether a fuel cell voltage has increased after supply of hydrogen, and a first startup of consuming generated electric power of the fuel cell through connection of a load device to the fuel cell, supplying air to the fuel cell through opening an air valve and adjusting the fuel cell voltage to be maintained at a predetermined level or less through adjustment of a bus stage voltage of a power converter when the controller determines that the fuel cell voltage has increased after supply of hydrogen.

13 Claims, 4 Drawing Sheets

(51) Int. Cl.
  *H01M 8/04746* (2016.01)
  *H01M 16/00* (2006.01)

(56) References Cited

FOREIGN PATENT DOCUMENTS

| | | |
|---|---|---|
| JP | 2005-158557 A | 6/2005 |
| JP | 2007-507063 A | 3/2007 |
| JP | 2008-010260 A | 1/2008 |
| JP | 2013-232428 A | 11/2013 |
| KR | 10-2008-0053864 A | 6/2008 |
| KR | 2010-0060478 A | 6/2010 |
| KR | 10-1449299 B1 | 10/2014 |
| KR | 2014-0145938 A | 12/2014 |
| KR | 10-2015-0028146 A | 3/2015 |
| KR | 10-2015-0045200 A | 4/2015 |
| KR | 2015-0074310 A | 7/2015 |

* cited by examiner

METHOD FOR CONTROLLING STARTUP OF FUEL CELL VEHICLE

CROSS-REFERENCE TO RELATED APPLICATION

This application claims the priority benefit of Korean Patent Application No. 10-2015-0175302, filed on Dec. 9, 2015 in the Korean Intellectual Property Office, the disclosure of which is incorporated herein by reference.

BACKGROUND

1. Field of the Invention

The present invention relates to a method for controlling startup of a fuel cell vehicle, and more particularly, to a method for controlling startup of a fuel cell vehicle that achieves startup thereof through supply of hydrogen and air.

2. Description of the Related Art

Startup of a fuel cell vehicle is achieved based on a sequence in which air is supplied to a cathode after supply of hydrogen to an anode. Generally, pre-control is performed after startup is completed, to perform operations including operation of an air cutoff valve, connection of a fuel cell load device, periodic supply of hydrogen, etc. for a standby time, to prevent oxygen from remaining in a stack. However, when the vehicle is left in an engine-OFF state for a substantial period of time due to, for example, long-term parking, oxygen is introduced into an anode of the stack, in spite of the above-mentioned pre-control. Accordingly, subsequent startup is unavoidably performed when oxygen is present at the anode of the stack.

When hydrogen is supplied to the anode, for startup, under the above-mentioned situation, an increase in voltage of the fuel cell occurs and, as such, carbon erosion may be generated at the cathode. Therefore, it is necessary to perform control for preventing carbon erosion of the cathode during startup, that is, to rapidly remove oxygen present at the anode, through supply and discharge of hydrogen while preventing high voltage from being generated at the fuel cell during removal of oxygen.

The above matters disclosed in this section are merely for enhancement of understanding of the general background of the invention and should not be taken as an acknowledgement or any form of suggestion that the matters form the related art already known to a person skilled in the art.

SUMMARY

Therefore, the present invention provides a startup control method of a fuel cell vehicle capable of preventing carbon erosion of a cathode during startup.

In accordance with the present invention, the above and other objects may be accomplished by the provision of a method for controlling startup of a fuel cell vehicle including start of detecting generation of a startup command from a vehicle in a controller, hydrogen supply of supplying hydrogen to a fuel cell through opening of a hydrogen valve in the controller, voltage detecting of detecting whether a fuel cell voltage has increased after supply of hydrogen in the controller, and first startup of consuming generated electric power of the fuel cell through connection of a load device to the fuel cell, supplying air to the fuel cell through opening an air valve and adjusting the fuel cell voltage to be maintained at a predetermined level or less through adjustment of a bus stage voltage of a power converter in the controller when the controller determines that the fuel cell voltage has increased after supply of hydrogen.

During the first startup, when the controller determines that the voltage of the fuel cell has increased after supply of hydrogen, the controller may be configured to increase a pressure of supplied hydrogen through operation of a hydrogen valve, and may be configured to purge hydrogen from the fuel cell to the outside through operation of a hydrogen purge device. During the first startup, when the controller determines that the fuel cell voltage has increased after supply of hydrogen, the controller may be configured to increase a pressure of supplied hydrogen, and connect the load device to the fuel cell after a predetermined time (t1) passes.

During the first startup, when the air valve is opened, the controller may be configured to disconnect the fuel cell from the load device, and adjust the bus stage voltage of the power converter. During the first startup, the controller may be configured to charge a high voltage battery connected to a bus stage with electric power generated from the fuel cell, through the adjustment of the bus stage voltage of the power converter.

The method may further include purge detection of detecting a time passing after final hydrogen purge in the controller, after the hydrogen supply, and second startup of supplying air to the fuel cell through opening of the air valve, and adjusting the fuel cell voltage to be maintained at a predetermined level or less through the adjustment of the bus stage voltage of the power converter in the controller when the passed time is equal to or less than a predetermined time (t2).

During the second startup, when the controller determines that the fuel cell voltage does not increase after supply of hydrogen, and the passed time is equal to or less than the predetermined time (t2), the controller may be configured to supply air to the fuel cell for a predetermined time (t3) by opening the air valve, and may be configured to adjust the fuel cell voltage to be maintained at a predetermined level or below through the adjustment of the bus stage voltage of the power converter.

During the second startup, when the controller determines that the fuel cell voltage does not increase after supply of hydrogen, and the passed time exceeds the predetermined time (t2), the controller may be configured to supply air to the fuel cell for a predetermined time (t4) by opening the air valve, and may be configured to adjust the fuel cell voltage to be maintained at a predetermined level or less through the adjustment of the bus stage voltage of the power converter, and the predetermined time (t4) may be greater than the predetermined time (t3). During the second startup, the controller may be configured to supply air to the fuel cell, and may be configured to purge hydrogen from the fuel cell after a predetermined time (t5) passes by operating a hydrogen purge device.

The method may further include hydrogen detection of detecting a cutoff time passing after final cutoff of supply of hydrogen in the controller after the purge detection. In particular, during the second startup, when the passed time exceeds the predetermined time (t2), and the cutoff time is equal to or less than a predetermined time (t6), the controller may be configured to supply air to the fuel cell for the predetermined time (t4) by opening the air valve, and may be configured to adjust the fuel cell voltage to be maintained at a predetermined level or less through the adjustment of the bus stage voltage of the power converter.

During the second startup, in response to determining that the passed time exceeds the predetermined time (t2), the cutoff time exceeds the predetermined time (t6), and the fuel cell voltage does not increase after supply of hydrogen, the controller may be configured to supply air to the fuel cell for the predetermined time (t4) by opening the air valve, and may be configured to adjust the fuel cell voltage to be maintained at a predetermined level or less through the adjustment of the bus stage voltage of the power converter. In response to determining that the passed time exceeds the predetermined time (t2), the cutoff time exceeds the predetermined time (t6), and the fuel cell voltage has increased after supply of hydrogen, the controller may be configured to perform the first startup.

The method may further include pre-detection of detecting a voltage of the fuel cell before supply of hydrogen in the controller, after the start, and third startup of adjusting the fuel cell voltage to be maintained at a predetermined level or less through the adjustment of the bus stage voltage of the power converter in the controller after supply of hydrogen, and supplying air to the fuel cell through opening of the air valve after a predetermined time (t7) passes, when the controller determines that the fuel cell voltage before supply of hydrogen is high.

In accordance with the startup control method of the fuel cell vehicle of the present invention, it may be possible to prevent carbon erosion of the cathode during startup of the fuel cell vehicle.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. Wherever possible, the same reference numbers will be used throughout the drawings to refer to the same or like parts.

Figure 1:
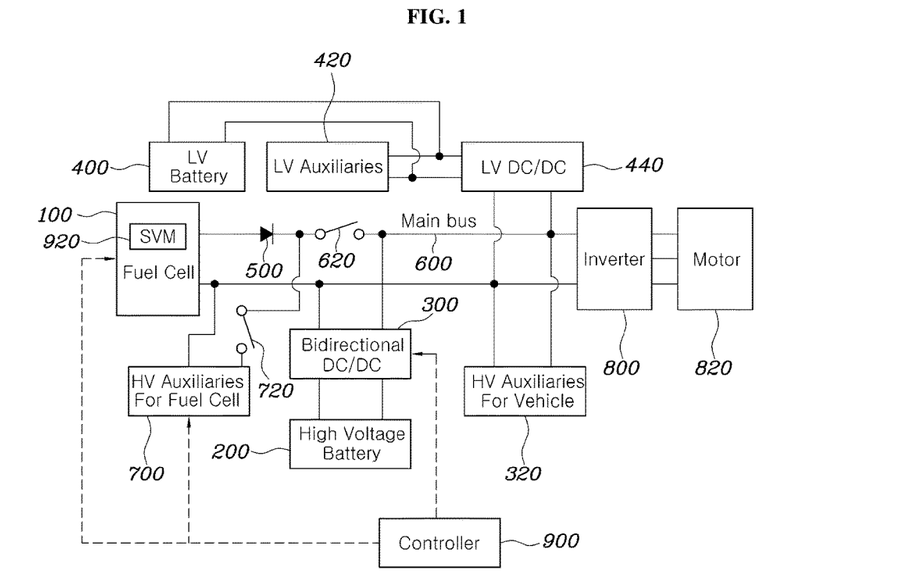
FIG. 1 is a diagram illustrating a system of a fuel cell vehicle for performing a startup control method of the fuel cell vehicle according to an exemplary embodiment of the present invention.
Figure 2:
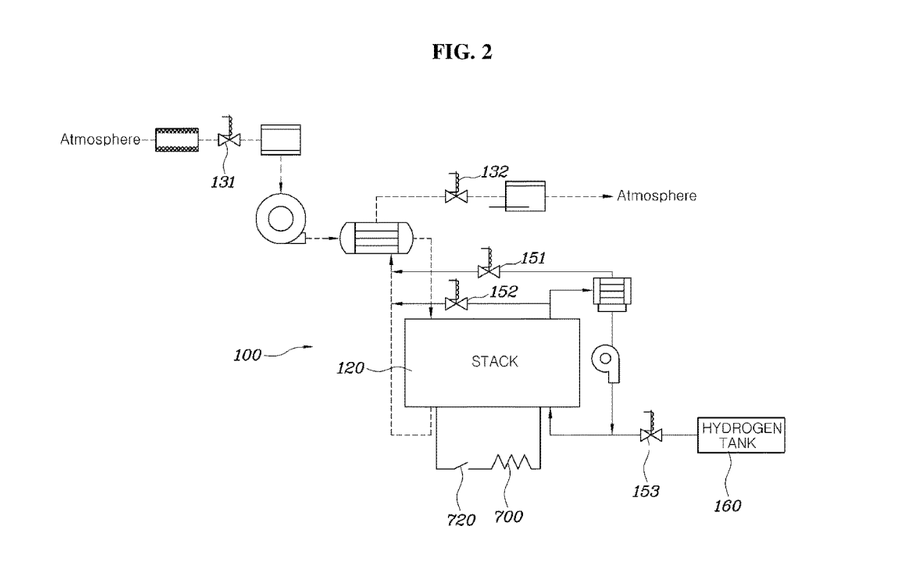
FIG. 2 is a diagram illustrating a system of a fuel cell for performing a startup control method of a fuel cell vehicle according to an exemplary embodiment of the present invention.
Figure 3:
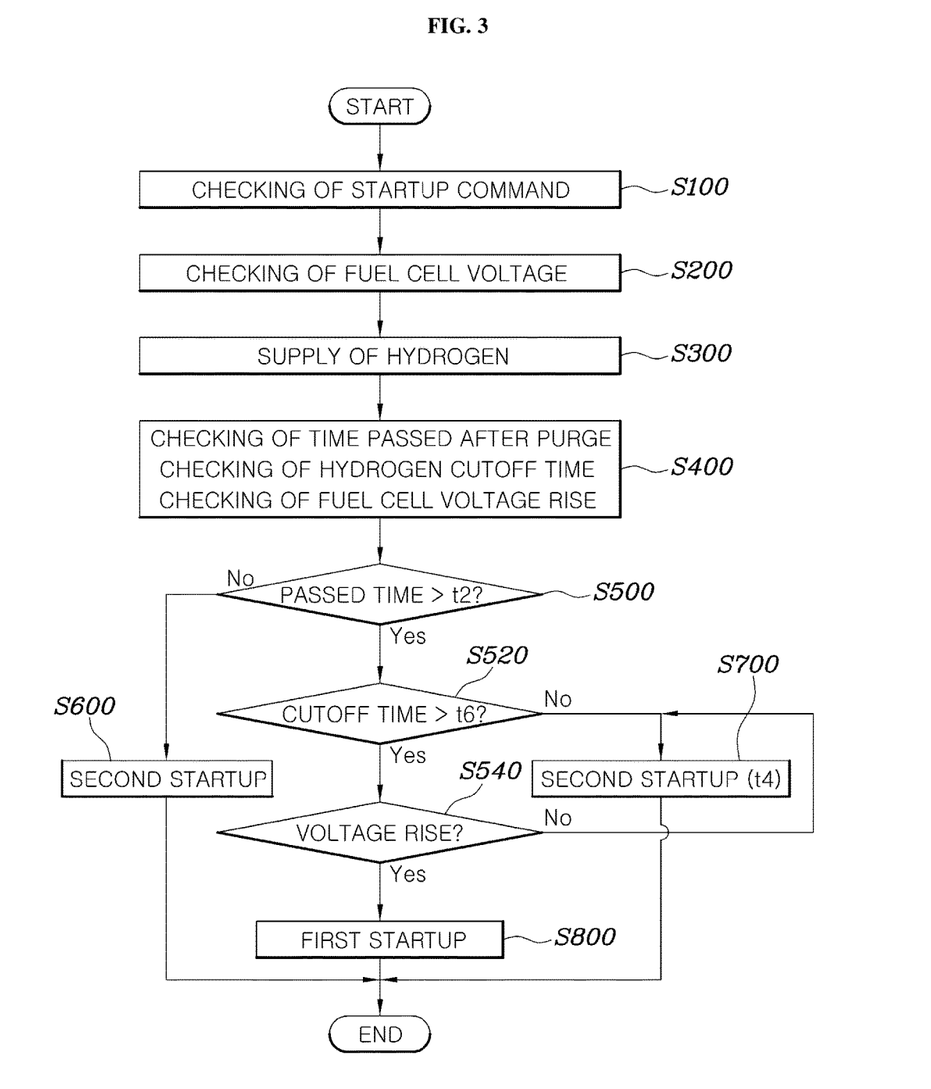
FIG. 3 is a flowchart illustrating the startup control method of the fuel cell vehicle according to the illustrated exemplary embodiment of the present invention.

FIG. 1 is a diagram illustrating a system of a fuel cell vehicle for performing a startup control method of the fuel cell vehicle according to an exemplary embodiment of the present invention. FIG. 2 is a diagram illustrating a system of a fuel cell for performing a startup control method of a fuel cell vehicle according to an exemplary embodiment of the present invention. FIG. 3 is a flowchart illustrating the startup control method of the fuel cell vehicle according to the illustrated exemplary embodiment of the present invention. FIGS. 4 to 8 are diagrams illustrating detailed startup procedures of the startup control method of the fuel cell vehicle according to the illustrated exemplary embodiment of the present invention.

FIG. 1 is a diagram illustrating a control system of a fuel cell vehicle for performing a startup control method of the fuel cell vehicle according to an exemplary embodiment of the present invention. The system may be a hybrid system of a fuel cell and a high voltage battery. At a high voltage battery stage in the system there is a bidirectional power converter 300, namely, a bidirectional direct-current (DC)/DC converter, connected to a high voltage battery 200, to adjust output power of a high voltage battery 200. In addition, a high voltage electronic load 320 may be provided, except for an inverter 800 and a motor 820, a low voltage battery 400, a low voltage electronic load 420 such as low voltage auxiliaries, and a low voltage power converter 440, namely, a low voltage DC/DC converter, configured to convert a high voltage into a low voltage.

Further, at a fuel cell stage of the system, a diode 500 may be provided to prevent reverse current from flowing to a fuel cell 100, and a main relay 620 may be configured to connect the fuel cell 100 to a main bus 600. In addition, a high voltage load device 700, such as high voltage auxiliaries for the fuel cell 100, to be used for the fuel cell 100 may be connected to the fuel cell 100, for removal of voltage upon startup and shutdown of the fuel cell 100. In the following description, the high voltage load device 700 may also be referred to as a "fuel cell load device". As a relay for operating the fuel cell load device 700 for the fuel cell 100, a normally-closed relay 720 should be used since the fuel cell load device 700 should always be connected to the fuel cell 100 even after completion of startup.

The fuel cell load device 700 may also be used as a device configured to recover regenerative braking energy from the motor 820, to decrease a high fuel cell voltage upon startup. The present invention relates to methods for decreasing a fuel cell voltage upon startup. When it is desired to use the fuel cell load device 700, the main relay 620 should be switched off. Additionally, when it is desired to perform voltage decreasing control for a bus stage of the high voltage power converter connected to the main bus 600, the main relay 620 should be switched on.

FIG. 2 is a diagram illustrating a system of a fuel cell for performing a startup control method of a fuel cell vehicle according to an exemplary embodiment of the present invention. In this system, air cutoff valves 131 and 132 may be installed at an air inlet and an air outlet, respectively, to prevent introduction of air after completion of startup. A drain valve 151 may be installed at an outlet of a hydrogen line, to remove water accumulated at an anode. A purge valve 152 may also be installed at the hydrogen line, to maintain a desired hydrogen concentration of the anode. Hydrogen purged by the purge valve 152 may be discharged to the air outlet (to dilute the discharged hydrogen with air).

A load device 700 for voltage removal may be continuously connected to remove oxygen from a stack during and after completion of startup. Introduced oxygen (e.g., it may be difficult to completely prevent introduction of ambient air even when the air cutoff valves operate) may be removed as current is consumed through the load device 700 (e.g., hydrogen remaining at the anode may also be consumed). When the amount of hydrogen at the anode is insufficient, introduced oxygen may no longer be consumed through consumption of current by the load device 700. Accordingly, wakeup technology may be used to periodically fill the anode with hydrogen at intervals of a predetermined time (e.g., 8 hours) before hydrogen remaining at the anode is completely consumed.

Wakeup control for supply of hydrogen has a limitation as to the number of times thereof since it is legally prohibited to directly supply hydrogen from a hydrogen tank 160 to a stack 120 by opening a valve 153 connected between the hydrogen tank 160 and the stack 120 and, as such, supply of hydrogen may be performed, using a pressure of a hydrogen supply line connected to an outlet of the valve 153. When wakeup control for supply of hydrogen is no longer possible, subsequent startup may be performed under the condition that oxygen is present in the stack 120. Thus, it is necessary to perform control for preventing carbon erosion of the cathode caused by oxygen remaining in the stack 120 during startup.

FIG. 3 is a flowchart illustrating the startup control method of the fuel cell vehicle according to the illustrated exemplary embodiment of the present invention. The startup control method according to the present invention may include start S100 of detecting generation of a startup command from the vehicle in a controller 900, hydrogen supply S300 of supplying hydrogen to the fuel cell 100 through opening of the hydrogen valve 153 in the controller 900, voltage detection S400 of detecting whether a fuel cell voltage has increased after supply of hydrogen in the controller 900, and first startup S800 of consuming generated electric power of the fuel cell 100 through connection of the load device 700 to the fuel cell 100, supplying air to the fuel cell 100 through opening the air valve 131 and adjusting the voltage of the fuel cell 100 to be maintained at a predetermined level or less through adjustment of a bus stage voltage of the power converter connected to the main bus 600 in the controller 900 when the controller 900 determines that the fuel cell voltage has increased after supply of hydrogen (S540).

In particular, the voltage of the fuel cell 100 may be monitored and measured by a stack voltage monitor (SVM) 920. The SVM 920 may be configured to measure a voltage of each cell, and transmit information representing the measured voltage to an upper controller, namely, a fuel cell controller 900. Adjustment of the bus stage voltage of the power converter connected to the main bus 600 may be performed by the bidirectional DC/DC converter 300 connected to the main bus 600. Accordingly, the bus stage voltage of the power converter connected to the main bus 600 may be operated to be decreased. Additionally, when the main relay 620 is closed, generated electric power from the fuel cell 100 may be used to charge the high voltage battery 200.

Startup of the fuel cell is achieved based on a sequence in which air is supplied to the cathode after supply of hydrogen to the anode. Pre-control may be performed after startup is completed, to perform certain operations including operation of the air cutoff valve 131, connection of the fuel cell load device 700, periodic supply of hydrogen, etc. for a standby time, to prevent oxygen from remaining in the stack 120. However, when the vehicle is left in an engine-OFF state for a substantial period of time, oxygen may be introduced into the anode of the stack 120, in spite of the above-described pre-control. Accordingly, subsequent startup is unavoidably performed under the condition that oxygen is present at the anode of the stack 120.

When hydrogen is supplied to the anode, for startup, under the above-described situation, an increase in voltage of the fuel cell may occur and, as such, carbon erosion may be generated at the cathode. Therefore, it is necessary to perform control for preventing carbon erosion of the cathode during startup, that is, to rapidly remove oxygen present at the anode, through supply and discharge of hydrogen while preventing a high voltage from being generated at the fuel cell during removal of oxygen. When the voltage of the fuel cell increases after supply of hydrogen, the cause may be due to long-term parking of the vehicle. In particular, accordingly, it may be necessary to decrease the voltage of the fuel cell rising during removal of oxygen. Accordingly, the first startup S800 may be performed in the present invention.

During the first startup 800, when the controller 900 determines that the voltage of the fuel cell has increased after supply of hydrogen, the controller 900 may be configured to increase the pressure of supplied hydrogen through operation of the hydrogen valve 153, and may be configured to purge hydrogen from the fuel cell to the outside through operation of a hydrogen purge device. During the first startup 800, when the air valve is opened, the controller 900 may be configured to disconnect the fuel cell from the load device, and adjust the bus stage voltage of the power converter. Particularly, voltage increase may be an indication that the voltage difference between the fuel cell voltage before supply of hydrogen and the fuel cell voltage after supply of hydrogen is equal to or greater than a predetermined value stored in a memory or that the fuel cell voltage after supply of hydrogen is equal to or greater than a reference value stored in the memory.

For determination of whether oxygen remains in the stack 120 during supply of hydrogen, it may be necessary to secure a fuel cell voltage detection time of about 2 seconds between start of supply of hydrogen and start of supply of air following the hydrogen supply. When the fuel cell voltage increases during this time period, an oxygen atmosphere may be determined to have been formed in the stack 120 and, as such, control for preventing carbon erosion of the cathode (strengthened supply and discharge of hydrogen and lowering of the fuel cell voltage through connection of the fuel cell load device) may be performed.

Figure 4:
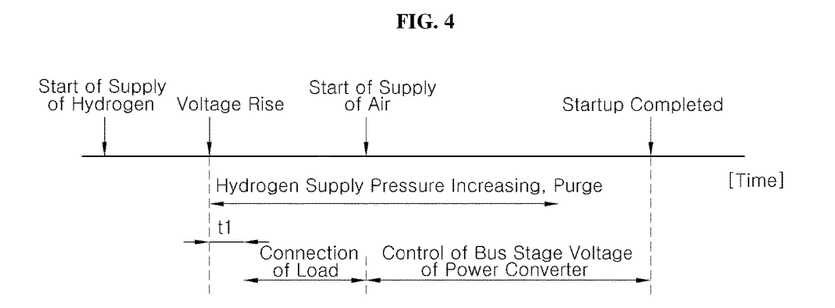
FIGS. 4 to 8 are diagrams illustrating detailed startup procedures of the startup control method of the fuel cell vehicle according to the illustrated exemplary embodiment of the present invention.

A substantial period of time may be required for removal of oxygen from the anode since the anode oxygen removal process is a process of re-circulating discharged oxygen through a hydrogen re-circulation line. Accordingly, as illustrated in FIG. 4, the present invention proposes that the time from start of supply of hydrogen to start of supply air is fixed as a standby time for detection of the fuel cell voltage, and anode oxygen removal may be executed under the condition that the anode oxygen removal period is divided into a period before supply of air and a period after supply of air.

The present invention proposes a method in which the fuel cell load device 700 is connected to the fuel cell before supply of air, and voltage decrease control is performed through adjustment of the bus stage voltage of the power converter connected to the main bus 600 after supply of air (e.g., the fuel cell voltage being decreased to about 380V, and then being maintained at the decreased voltage, to maintain each cell voltage of the fuel cell at about 0.8V). As illustrated in FIG. 4, during the first startup S800, electric power generated from the fuel cell may be used to charge the high voltage battery connected to the bus stage through adjustment of the bus stage voltage of the power converter. In addition, adjustment of strengthened hydrogen supply/discharge of hydrogen may be continuously performed during removal of oxygen from the anode before supply of air and also after supply of air (e.g., for 2 seconds or more). Accordingly, it may be possible to solve a problem of a lengthened startup time caused by execution of the control for preventing carbon erosion of the cathode (delayed start of supply of air).

In particular, connection of the fuel cell load device 700 may be performed after detection of whether hydrogen has been uniformly supplied to the anode as well as detection of an increase of the fuel cell voltage (e.g., for a time t1). Generally, hydrogen may be completely supplied to the anode of each cell within 1 second after start of supply of hydrogen. When a load is used under the condition that hydrogen is incompletely supplied to all cells of the fuel cell, a particular one of the cells, to which hydrogen has been incompletely supplied, may be degraded due to consumption of current performed in a hydrogen shortage state.

The startup control method according to the present invention may further include purge detection S400 of detecting a time period passing (e.g., elapsing) after final hydrogen purge in the controller 900, after the hydrogen supply S300, and second startup S600 of supplying air to the fuel cell through opening of the air valve, and adjusting the voltage of the fuel cell to be maintained at a predetermined level or less through adjustment of the bus stage voltage of the power converter in the controller 900.

In particular, in the second startup S600, when the controller 900 determines that the voltage of the fuel cell does not increase even after supply of hydrogen, and the passed time is equal to or less than a predetermined time t2, the controller 900 may be configured to open the air valve for a predetermined time t3, and may be configured to adjust the voltage of the fuel cell to be maintained at a predetermined level or less through adjustment of the bus stage voltage of the power converter.

Figure 5:
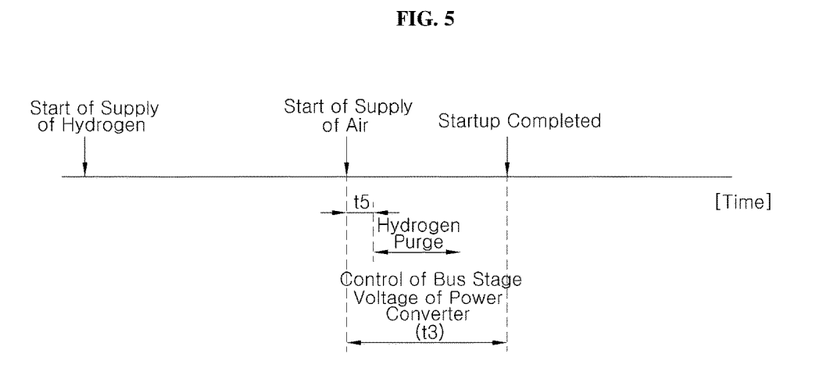

When voltage increase does not occur in the fuel cell voltage detection period, the startup sequence proceeds to the second startup S600 without execution of cathode carbon erosion control. This case corresponds to when the vehicle has not been parked for a substantial period of time, but has been parked for a short period of time, or the case of a general parking situation between long-term parking and short-term parking. As illustrated in FIG. 5, when there is no voltage increase in the voltage detection period after supply of hydrogen, supply of air may be performed, and fuel cell voltage decreasing control may be performed after supply of air, to prevent a high-voltage operation of the fuel cell. When the voltage generated in the fuel cell approximates to an open circuit voltage (OCV), degradation of the fuel cell may occur due to exposure of the fuel cell to a high voltage. Accordingly, it is also necessary to perform control for preventing a high-voltage operation of the fuel cell.

The fuel cell voltage decreasing control may be achieved, using a method of charging an output from the fuel cell to the high voltage battery through a control of decreasing the bus stage voltage of the power converter. When connection of the fuel cell load is used, the output of the fuel cell may be continuously consumed by the load device and, as such, fuel economy may be adversely affected. Accordingly, the bus stage voltage decreasing control through the power converter is suitable.

Similarly to the first startup S100, a purge control for discharging hydrogen to the outside may also be performed in the second startup S600 to secure a desired hydrogen concentration of the anode. However, under the condition that there is no hydrogen at the anode, and only oxygen and nitrogen has been present at the anode during the first startup S100, the second startup S600 may be performed under the condition that the atmosphere of the anode is an oxygen/nitrogen atmosphere. Oxygen introduced from the outside may be completely consumed based on reaction thereof with hydrogen remaining at the anode (direct reaction or consumption of current by the load device) and, as such, the amount of hydrogen at the anode may be reduced, and the amount of nitrogen may be increased as the engine-OFF period increases.

Once hydrogen is completely consumed, oxygen may be introduced into the stack and, as such, oxygen may also be present at the anode. As a result, conditions of the first startup S100 are established. In particular, internal stack conditions of the first startup S100 are unfavorable in terms of securing a desired hydrogen concentration. Accordingly, the number of hydrogen purge times during the first startup S100 may be at least equal to or greater than the number of hydrogen purge times during the second startup S600. Additional control for increasing a hydrogen supply pressure may also be performed to increase anode oxygen removal efficiency.

The hydrogen purge control during the second startup S600 may be performed after a predetermined time t5 elapses after supply of air, differently than that of the first startup S100. The condition of the second startup S600 may be considered as corresponding to the condition that there is no oxygen in the stack, and hydrogen remains more or less at the anode. When hydrogen purge is performed before supply of air under the above-described condition, the hydrogen concentration of exhaust gas may be increased and, as such, may not satisfy regulations as to exhaust gas hydrogen concentration.

Accordingly, hydrogen purge may be performed after supply of air to discharge purged hydrogen after being diluted with supplied air and, as such, it may be possible to satisfy regulations as to exhaust gas hydrogen concentration. Further, during the first startup S100, a substantial amount of oxygen remains in the stack, and no hydrogen may be present at the anode. Under this condition, although hydrogen purge control is directly performed when voltage increase occurs before supply of air, it may be possible to sufficiently satisfy regulations as to exhaust gas hydrogen concentration.

Figure 6:
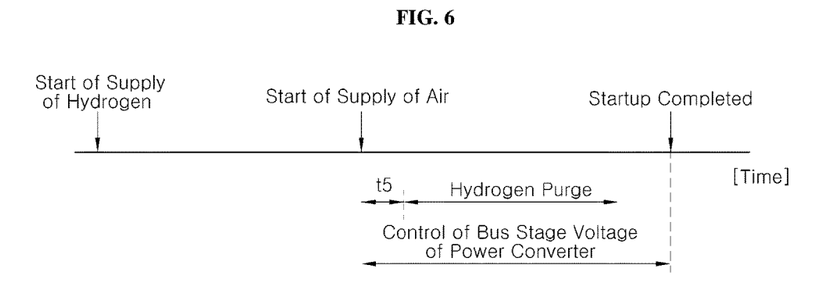

During the second startup S700, as illustrated in FIG. 6, when the controller 900 determines that the voltage of the fuel cell does not increase after supply of hydrogen, and the passed time exceeds the predetermined time t2 (S500), the controller 900 may be configured to supply air to the fuel cell for a predetermined time t4 by opening the air valve. At the same time, the controller 900 may be configured to adjust the voltage of the fuel cell to be maintained at a predetermined level or less through control of the bus stage voltage of the power converter. The predetermined time t4 may be greater than the predetermined time t3. In other words, the case of FIG. 6 means control performed when general startup is performed in a situation other than short-term parking of FIG. 5.

The startup control method according to the present invention may further include hydrogen detection S400 of detecting a cutoff time passing after final cutoff of supply of hydrogen in the controller 900, after the purge detection. During the second startup S700, when the passed time exceeds the predetermined time t2, and the cutoff time may be equal to or less than a predetermined time t6, the controller 900 may be configured to supply air to the fuel cell for the predetermined time t4 by opening the air valve. At the same time, the controller 900 may be configured to adjust the voltage of the fuel cell to be maintained at a predetermined level or less through adjustment of the bus stage voltage of the power converter.

The second startup may be divided into short-term parking mode startup S600 and general startup S700. The situation associated with the short-term parking mode startup S600 corresponds to a situation in which a sufficient amount of hydrogen remains at the anode, as in the case of FIG. 5, and, as such, startup may be performed under the condition that the number of hydrogen purge times is decreased or without hydrogen purge, and under the condition that the sequence of the startup is about the same as that of the general startup mode. The short-term parking mode startup situation may be determined as follows.

In other words, the time when final hydrogen purge starts during operation of the fuel cell may be recorded. Further, information as to an elapsed time until startup after final hydrogen purge may be extracted, based on a difference between the recorded final hydrogen purge time and the time when subsequent startup starts. When the elapsed time is minimal, namely, equal to or less than the predetermined time t2, the controller may be configured to determine that the current situation corresponds to a situation in which it is unnecessary to perform control for securing a desired hydrogen concentration and, as such, hydrogen purge may be omitted or the number of hydrogen purge times may be reduced. During operation of the fuel cell, hydrogen purge control may be performed at intervals of a predetermined time, to secure a desired hydrogen concentration (e.g., removal of nitrogen from the anode).

In connection with this, it may be possible to most correctly determine whether control for securing a desired hydrogen concentration is required when the determination is performed based on the information related to the elapsed time after final hydrogen purge. For extraction of such information, it may be necessary to use a controller capable of recording time information even after engine-OFF. In connection with this, a real time clock (RTC) chip, which is used for wakeup control after engine-OFF, may be used.

In addition, during the second startup S700, in response to determining that the passed time exceeds the predetermined time t2, the cutoff time exceeds the predetermined time t6, and the voltage of the fuel cell does not increase after supply of hydrogen, the controller 900 may be configured to supply air to the fuel cell for the predetermined time t4 by opening the air valve. At the same time, the controller 900 may be configured to adjust the voltage of the fuel cell to be maintained at a predetermined level or less through adjustment of the bus stage voltage of the power converter. Further, in response to determining that the elapsed time exceeds the predetermined time t2, the cutoff time exceeds the predetermined time t6, and the voltage of the fuel cell has increased after supply of hydrogen, the controller 900 may be configured to perform the first startup S800.

Conventional long-term/general/short-term parking mode startup methods are performed under the condition that the standby time until start of supply of air after supply of hydrogen is fixed, to enable detection of whether the voltage of the fuel cell increases during a hydrogen supply period. However, detection of whether the voltage of the fuel cell increases is performed to determine whether there is no hydrogen in the stack, and an oxygen atmosphere has been established in the stack. Accordingly, when information regarding the condition that no oxygen atmosphere has been established in the stack is provided before startup, it may be unnecessary to set a standby time for detection of fuel cell voltage increase.

In other words, it may be previously determined that it is unnecessary to perform control for preventing carbon erosion of the cathode during long-term parking mode startup when the time passing after cutoff of supply of hydrogen is minimal, namely, equal to or less than the predetermined time t2, the cutoff time passing after final hydrogen purge event is minimal, namely, equal to less than the predetermined time t6, or the voltage of the fuel cell before supply of hydrogen is high. This situation corresponds to a situation in which hydrogen remains at the anode. In particular, accordingly, oxygen introduced after engine-OFF may be immediately removed based on reaction thereof with the remaining hydrogen or by the fuel cell load device. Although the fuel cell voltage before supply of hydrogen is high and, as such, oxygen is present in the stack, it may be unnecessary to perform the cathode carbon erosion prevention control since hydrogen remains at the anode.

In particular, supply of air may be performed immediately after supply of hydrogen without securing a standby time for detection of fuel cell voltage increase. Accordingly, the startup time may be reduced. After supply of air, however, it may be necessary to decrease the bus stage voltage of the power converter, prevent a high voltage from being generated at the fuel cell, due to the fuel cell voltage increase after supply of air. In particular, a fuel cell load may be generated. Accordingly, once it is detected whether oxygen has been uniformly supplied to the anode after supply of hydrogen, the bus stage voltage of the power converter may be decreased through operation of the power converter, after supply of air. Similarly to the general/short-term parking mode startup methods, hydrogen purge control may be performed after supply of air. In addition, when the time elapsing after final hydrogen purge event is minimal, this situation is determined to correspond to short-term parking mode startup. In particular, accordingly, hydrogen purge may be omitted or the number of hydrogen purge times may be reduced, as compared to that of general startup.

Figure 7:
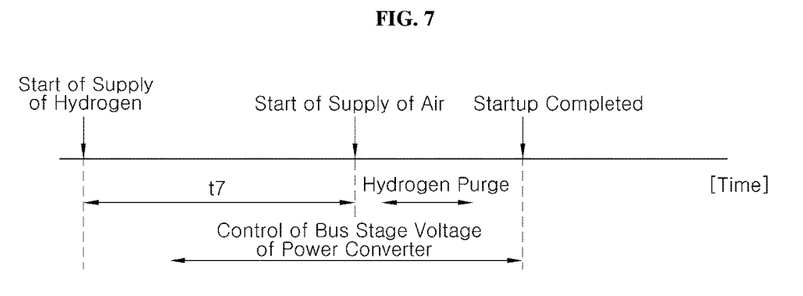
Figure 8:
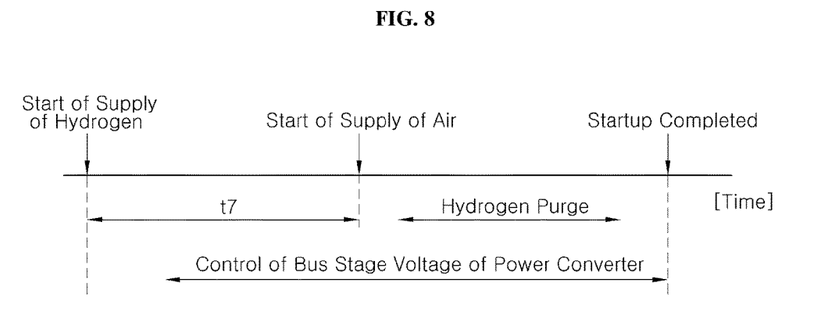

Meanwhile, as illustrated in FIGS. 7 and 8, the startup control method according to the present invention may further include pre-detection S200 of detecting a voltage of the fuel cell before supply of hydrogen in the controller 900, after the start S100, and third startup (in the case of FIG. 7 or 8) of controlling a voltage of the fuel cell 100 to be maintained at a predetermined level or less through adjustment of the bus stage voltage of the power converter in the controller 900 after supply of hydrogen, and supplying air to the fuel cell through opening of the air valve after a predetermined time t7 elapses, when the controller 900 determines that the fuel cell voltage before supply of hydrogen is high. The fuel cell voltage may be determined by previously storing a reference value, and comparing a measured value with the stored reference value.

Exceptionally, when the fuel cell voltage before supply of hydrogen is high, the startup sequence does not proceed to the first startup S800, but may proceed to the second startup S700, even when the fuel cell voltage increase during supply of hydrogen. The condition that the fuel cell voltage before supply of hydrogen is high indicates a situation in which hydrogen remains at the anode, in addition to oxygen and, as such, it may be unnecessary to perform the cathode carbon erosion prevention control for removal of oxygen from the anode.

Furthermore, when control of strengthened hydrogen supply/discharge of hydrogen is performed before supply of air, for cathode carbon erosion prevention control, it may be impossible to satisfy regulations as to exhaust gas hydrogen concentration due to hydrogen remaining at the anode. In particular, accordingly, hydrogen purge control may be performed after supply of air, as in the case of general startup. Upon shutdown of the fuel cell, a process of removing oxygen from the stack to the fuel cell load is performed. When startup occurs in the process of shutdown, the startup sequence proceeds under the condition that the removal process may be omitted and, as such, the fuel cell voltage before supply of hydrogen may increase.

Although the fuel cell load device 700 should always be connected to the fuel cell 100 in an engine-OFF state of the vehicle after completion of startup, both hydrogen and oxygen may be present in the stack when the fuel cell cannot be connected to the load device due to failure of the load device or failure of the relay. When startup of the fuel cell is performed in such a situation, the fuel cell voltage before supply of hydrogen may increase.

Particularly, the fuel cell voltage decreasing control for preventing a high-voltage operation of the fuel cell may not be performed after supply of air, differently than the general startup mode. In response to determining whether hydrogen has been uniformly supplied to the anode, the fuel cell voltage decreasing control may be immediately performed, even before supply of air. Since the fuel cell voltage has been in a high state before supply of hydrogen and supply of air, the fuel cell voltage decreasing control may be performed by decreasing the bus stage voltage of the power converter, irrespective of before/after supply of air, when hydrogen has been uniformly supplied to the anode. Further, the fuel cell voltage decreasing control may be performed through two steps before and after supply of air using the fuel cell load device before supply of air, and performing control for decreasing the bus stage voltage of the power converter after supply of air, as in the case of long-term parking mode startup.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling startup of a fuel cell vehicle, comprising:
   detecting, by a controller, generation of a startup command from a vehicle;
   supplying, by the controller, hydrogen to a fuel cell through opening of a hydrogen valve;
   detecting, by the controller, whether a fuel cell voltage has increased after supply of hydrogen; and
   first startup of consuming, by the controller, generated electric power of the fuel cell through connection of a load device to the fuel cell, supplying air to the fuel cell through opening an air valve and adjusting the fuel cell voltage to be maintained at a predetermined level or less through adjustment of a bus stage voltage of a power converter when the controller determines that the fuel cell voltage has increased after supply of hydrogen.

2. The method according to claim 1, wherein, during the first startup, when the controller determines that the voltage of the fuel cell has increased after supply of hydrogen, the controller is configured to increase a pressure of supplied hydrogen through operation of a hydrogen valve, and purge hydrogen from the fuel cell to the outside through operation of a hydrogen purge device.

3. The method according to claim 2, wherein, during the first startup, when the controller determines that the fuel cell voltage has increased after supply of hydrogen, the controller is configured to increase a pressure of supplied hydrogen, and connect the load device to the fuel cell after a first predetermined time elapses.

4. The method according to claim 1, wherein, during the first startup, when the air valve is opened, the controller is configured to disconnect the fuel cell from the load device, and adjust the bus stage voltage of the power converter.

5. The method according to claim 1, wherein, during the first startup, the controller is configured to charge a high voltage battery connected to a bus stage with electric power generated from the fuel cell, through the adjustment of the bus stage voltage of the power converter.

6. The method according to claim 1, further comprising:
detecting, by the controller, a time passing after final hydrogen purge, after the hydrogen supply; and
second startup of supplying, by the controller, air to the fuel cell through opening of the air valve, and adjusting the fuel cell voltage to be maintained at a predetermined level or less through the adjustment of the bus stage voltage of the power converter when the passed time is equal to or less than a second predetermined time.

7. The method according to claim 6, wherein, during the second startup, when the controller determines that the fuel cell voltage does not increase after supply of hydrogen, and the passed time is equal to or less than a second predetermined time, the controller is configured to supply air to the fuel cell for a third predetermined time by opening the air valve, and adjust the fuel cell voltage to be maintained at a predetermined level or less through the adjustment of the bus stage voltage of the power converter.

8. The method according to claim 7, wherein, during the second startup, when the controller determines that the fuel cell voltage does not increase after supply of hydrogen, and the passed time exceeds the second predetermined time, the controller is configured to supply air to the fuel cell for a fourth predetermined time by opening the air valve, and adjust the fuel cell voltage to be maintained at a predetermined level or less through the adjustment of the bus stage voltage of the power converter, and the fourth predetermined time is greater than the third predetermined time.

9. The method according to claim 6, wherein, during the second startup, the controller is configured to supply air to the fuel cell, and purge hydrogen from the fuel cell after a fifth predetermined time elapses by operating a hydrogen purge device.

10. The method according to claim 6, further comprising:
detecting, by the controller, a cutoff time passing after final cutoff of supply of hydrogen after the purge detection,
wherein, during the second startup, when the passed time exceeds the second predetermined time, and the cutoff time is equal to or less than a sixth predetermined time, the controller is configured to supply air to the fuel cell for a fourth predetermined time by opening the air valve, and adjust the fuel cell voltage to be maintained at a predetermined level or less through the adjustment of the bus stage voltage of the power converter.

11. The method according to claim 10, wherein, during the second startup, in response to determining that the passed time exceeds the second predetermined time, the cutoff time exceeds the sixth predetermined time, and the fuel cell voltage does not increase after supply of hydrogen, the controller is configured to supply air to the fuel cell for a fourth predetermined time by opening the air valve, and adjust the fuel cell voltage to be maintained at a predetermined level or less through the adjustment of the bus stage voltage of the power converter.

12. The method according to claim 10, wherein, in response to determining that the passed time exceeds the second predetermined time, the cutoff time exceeds the sixth predetermined time, and the fuel cell voltage has increased after supply of hydrogen, the controller is configured to perform the first startup.

13. The method according to claim 1, further comprising:
detecting, by the controller, a voltage of the fuel cell before supply of hydrogen, after the start; and
third startup of adjusting, by the controller, the fuel cell voltage to be maintained at a predetermined level or less through the adjustment of the bus stage voltage of the power converter after supply of hydrogen, and supplying air to the fuel cell through opening of the air valve after a seventh predetermined time passes, when the controller determines that the fuel cell voltage before supply of hydrogen is high.

* * * * *